United States Patent [19]
Alessi

[11] 3,924,263
[45] Dec. 2, 1975

[54] SHUTTER CONTROL CIRCUIT FOR A PHOTOGRAPHIC CAMERA
[75] Inventor: Robert V. Alessi, Rochester, N.Y.
[73] Assignee: Eastman Kodak Company, Rochester, N.Y.
[22] Filed: May 22, 1974
[21] Appl. No.: 472,405

Related U.S. Application Data
[63] Continuation-in-part of Ser. No. 409,228, Nov. 24, 1973, Pat. No. 922,009.

[52] U.S. Cl. .................................. 354/50; 354/60 L
[51] Int. Cl.² ............................................ G03B 7/08
[58] Field of Search........... 354/31, 48, 50, 51, 60 L

[56] References Cited
UNITED STATES PATENTS
3,699,858  10/1972  Ogiso et al. ........................ 354/60 L
3,805,278  4/1974  Matsuzaki et al..................... 354/33

Primary Examiner—Joseph F. Peters, Jr.
Assistant Examiner—James LaBarre
Attorney, Agent, or Firm—D. P. Monteith

[57] ABSTRACT

A photographic camera includes an electronic shutter control circuit for controlling a camera shutter mechanism while permitting either time limited or extended time exposures under low scene light conditions. The shutter control circuit includes a timing device for closing the shutter comprising a first timer responsive to prevailing scene light conditions and a second timer having a fixed predetermined time constant, the second timer being adapted to close the shutter after a fixed time interval to eliminate extended time exposures. A network for indicating the adequacy of scene light for obtaining a proper exposure within the fixed time interval is coupled to the light responsive timer through a reversed biased diode to effectively render that timer incapable of controlling the shutter mechanism under low scene light conditions. A selectively actuatable switch member operably connected to the shutter control circuit functions to override the second timer, and to enable the light responsive timer to be operated in low scene light conditions if an extended time exposure is preferred by the camera operator.

7 Claims, 2 Drawing Figures

SHUTTER CONTROL CIRCUIT FOR A PHOTOGRAPHIC CAMERA

CROSS REFERENCE TO RELATED APPLICATIONS

This application is a continuation-in-part of application Ser. No. 409,228, filed Oct. 24, 1973 in the name of Robert V. Alessi, which issued on May 7, 1974 as Defensive Publication T922,009.

BACKGROUND OF THE INVENTION

1. Field of the Invention

This invention relates to photographic cameras, and more particularly to an electronic exposure control circuit for controlling a camera shutter mechanism.

2. Description of the Prior Art

The quality of a photograph obtained with a hand-held camera depends, of course, on many factors, not the least of which is the ability of the camera operator to hold the camera steady during the film exposure interval. It is known in the photographic industry that high quality hand-held exposures generally cannot be made when the exposure interval exceeds 1/30 second. The operator is unable to hold the camera steady for these longer exposure times with the result that the film image of the object being photographed is smeared with an attendant loss of resolution in the photographic prints made from the film negative.

Many of today's commercially available films have an exposure margin which in cases of limited amounts of underexposure, and for that matter, overexposures, the film negative can be processed to compensate for what would normally be considered an improperly exposed film to obtain a good useable print. This can be done by selectively varying some of the film processing parameters in a manner known to those having skill in the art.

It is possible, therefore, in some instances to limit or cut-off the exposure interval such as, for example, at the aforementioned 1/30 second and still obtain a good print even though the film is underexposed.

It is known in the prior art to provide apparatus in a camera for limiting the exposure interval to a predetermined maximum time interval. For example, U.S. Pat. No. 3,245,332, issued to S. Kagan on Apr. 12, 1966 discloses shutter control apparatus for terminating the film exposure interval after a predetermined period of time. The apparatus disclosed in the Kagan patent includes a timing circuit and a voltage-sensitive trigger circuit. The timing circuit, when actuated, produces a time variable voltage signal that reaches a level termed the trigger voltage in a period of time depending on the intensity of the prevailing scene light. The trigger circuit is responsive to the signal produced by the timing circuit for de-energizing a solenoid, which condition results in the termination of the film exposure interval. The shutter control apparatus further includes an auxiliary timing circuit which functions independent of the light dependent timing circuit. The auxiliary circuit, when actuated, functions to produce a control signal after a predetermined period of time to insure deenergization of the solenoid. The control signal serves to eliminate "hang-up" of the shutter mechanism, a condition that occurs in the shutter mechanism of the type described in Kagan under certain levels of low scene light conditions. More specifically, the Kagan patent is directed to the problem of preventing "recapture" of the shutter closing blade due to failure of the light dependent timing circuit to maintain the trigger circuit in an OFF condition for a sufficient duration to allow the shutter blade to close. The auxiliary circuit acts as a booster circuit to insure sufficient trigger circuit voltage at low illumination levels to prevent malfunction of the camera shutter.

U.S. Pat. No. 3,500,729, issued to W. T. Rentschler et al on Mar. 17, 1970, discloses an electronic timing device for controlling a camera shutter. A shutter timing device of the type described in the Rentschler et al patent comprises a first timing circuit responsive to prevailing light conditions and a second timing circuit having a fixed time constant of 1/30 second. The timing device further includes means generally intended for simultaneously energizing each of the timing circuits when the shutter is opened. When this happens, each of the timing circuits functions concurrently during the film exposure interval regardless of the amount of scene light to produce a control signal for closing the shutter. Whichever timing circuit first produces a control signal having a particular value, that signal functions to close the shutter.

Although there are advantages to having permanent, built-in exposure control devices, such as are disclosed in the aforementioned Rentschler and Kagan patents, for limiting exposure time to a predetermined time interval, cameras having such devices limit the flexibility of the camera operator. Cameras having these control devices cannot effectively be used in situations when a smear-free extended time exposure might be obtained. For example, mounting the camera on a tripod can for many type scenes overcome the detrimental effects which result when the camera is hand-held. Further, there exist many other types of scenes when it is desirable to have some relative scene movement so as to create a special effect or mood such as, for example, certain photographs under nighttime lighting conditions.

SUMMARY OF THE INVENTION

One of the objects of the present invention is to provide an improved electronic exposure control circuit for controlling a camera shutter mechanism.

A further object of this invention is to provide an improved exposure control circuit for a camera of the type which if hand-held, will provide smear-free exposures.

A further object of this invention is to provide an exposure control circuit having light indicating means for indicating the sufficiency of scene light for effecting an exposure within a time interval suitable for a hand-held picture taking operation.

A still further object of the invention is to provide an improved exposure control circuit for a camera of the type which under low light conditions can produce time limited exposures or which can be used to produce extended time exposures at the option of the camera operator.

A still further object of the invention is to provide an improved exposure control device for a camera of the type that is normally hand-held having an indicator device to indicate in advance of a film exposure either of two anticipated ranges of exposure times and to provide an option to the camera operator if a low light condition exists to select either a limited time exposure or an extended time exposure.

Another object of this invention is to provide an electronic exposure control circuit of the type described above in which the light indicator device renders a light responsive shutter device ineffective to control the shutter mechanism in low scene light conditions to thereby ensure a smear-free exposure.

A still further object of the instant invention is to provide an exposure control circuit of the aforementioned type which is of simple design and construction and economical to manufacture.

In accordance with the above objects, an electronic exposure control circuit for controlling an actuatable shutter movable relative to a camera aperture between a light unblocking position and a light blocking position to regulate the amount of light impinging on a camera film exposure plane comprises means operably associated with the shutter and energizable for regulating movement of the shutter between its light unblocking position and its light blocking position, timer means responsive to scene light for actuating the shutter regulating means after a time interval related to the intensity of scene light to control the film exposure interval in accordance with scene light intensity, means operably associated with the shutter regulating means for limiting the exposure interval to a fixed predetermined time interval that is independent of scene light intensity and selectively operatable means operably associated with the exposure interval limiting means for deactivating said limiting means to permit the timer means to exclusively control the shutter regulating means.

The exposure control circuit may further include means for indicating the adequacy of scene light to effect an exposure within a predetermined time period and means responsive to the light adequacy indicating means for rendering the timer means ineffective to control the shutter mechanism if the exposure cannot be effected within the predetermined time period.

Under a low scene light condition, the exposure can be limited to a fixed time interval determined by the time constant of the light independent timer means to thereby ensure a smear-free exposure. The light adequacy indicating means includes means for signalling to the camera operator when this condition exists so that the operator is alerted to the fact that the exposure would be prematurely terminated. If it was so desired the operator by actuating the selectively operatable means could override the exposure interval limiting means to permit the timer means to control the shutter regulating means in low light to effect an extended time exposure.

The invention, and its objects and advantages, will become more apparent in the detailed description of a preferred embodiment presented below.

BRIEF DESCRIPTION OF THE DRAWING

In the detailed description of a preferred embodiment of the invention presented below, reference is made to the accompanying drawing, in which.

DESCRIPTION OF A PREFERRED EMBODIMENT

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

Figure 1:
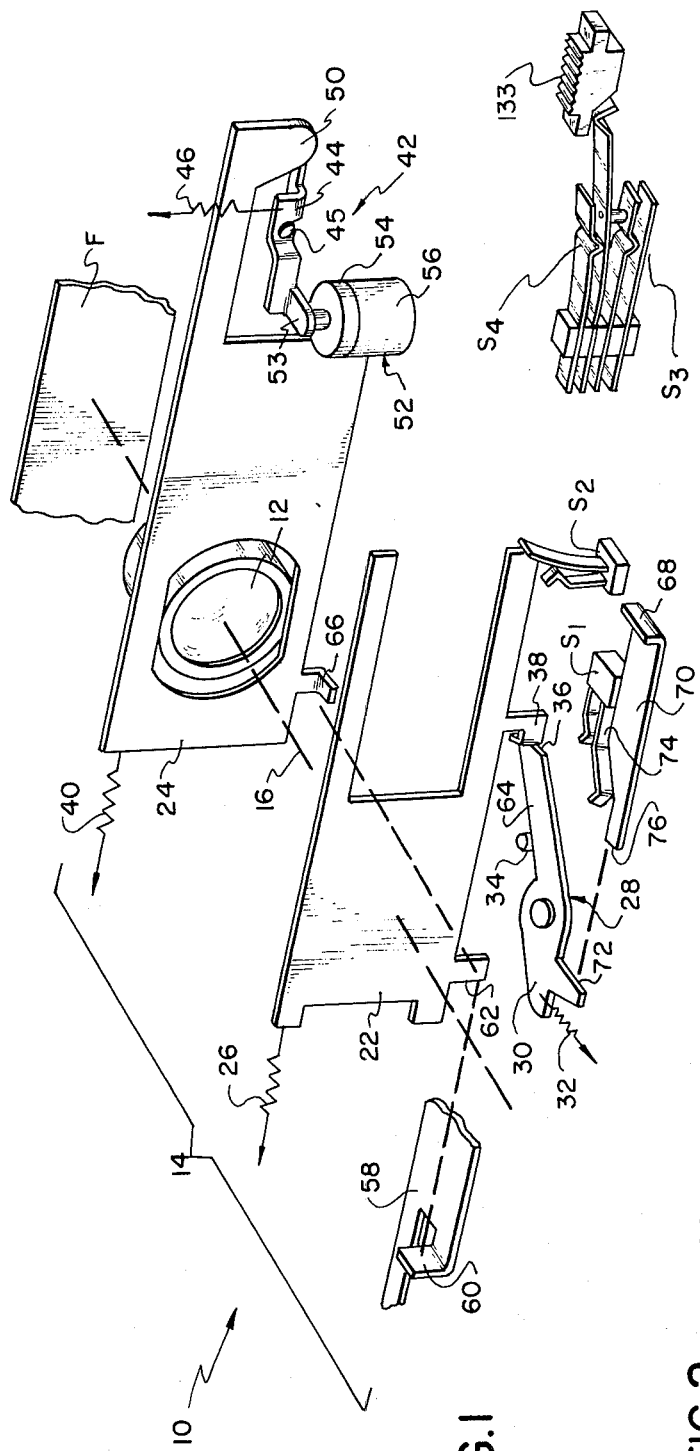
FIG. 1 illustrates an exploded perspective view of a portion of a camera with film loaded therein including a camera shutter mechanism adapted to effect exposure control of the film.

There is shown schematically in FIG. 1 a camera 10 having an objective lens 12 and shutter mechanism 14 for controlling the exposure of film F to light from a scene to be photographed. Objective lens 12 is positioned along an optical axis 16 for receiving and directing scene light onto film F which is located at the camera focal plane. Shutter mechanism 14 is actuated to effect proper exposure of film F, as described hereinafter.

Although not specifically shown camera 10, like some of the present commercially available cameras, may also include a diaphragm mechanism disposed along axis 16 for forming a variable exposure aperture in alignment with objective lens 12. One such mechanism of this type is described in U.S. Pat. No. 3,748,974 issued July 31, 1973 in the name of T. D. Cochran and assigned to the assignee of the instant invention.

Shutter mechanism 14 may include a pair of opaque shutter blades 22 and 24, each slidably mounted upon suitable support means (not shown) for movement transverse to optical axis 16 between an initial or cocked terminal position as shown in FIG. 1 and a final or released terminal position.

Each of these blades by virtue of their shape or configuration permits scene light, when in one terminal position, 6o impinge on film F whereas the opaque portions thereof serve to prevent scene light from impinging on the film, when such blades are in their respective other terminal position. That is blade 22, hereinafter called the "opening blade" since actuation thereof initiates the film exposure interval, is in its "light blocking position" when in the cocked position shown in FIG. 1 and is in the "light unblocking position" when in its other terminal position, the released position. Conversely, blade 24, hereinafter called the "closing blade" since actuation thereof terminates the exposure interval, is in the light unblocking position when in its cocked position, shown in FIG. 1, and is in the light unblocking position when in its released position.

Opening blade 22 is retained in its cocked position against the bias of a spring 26 by releasable engaging means 28 comprising a pivotally mounted latch member 30 which is biased in the counterclockwise direction as viewed in FIG. 1 by a spring 32 into latching position against a post 34. In this psoition, an end portion 36 of latch member 30 abuttingly engages a detent 38 to thereby retain opening blade 22 in its cocked position.

Closing blade 24 is retained in its cocked position against the bias of a spring 40 by releasable engaging means 42 comprising a retaining lever 44 pivotally mounted about a pin 45. Lever 44 is biased in the counterclockwise direction by a spring 46 into its retaining position shown in FIG. 1 wherein an end portion 48 of the lever engages a detent 50 of closing blade 24. The bias force exerted by spring 46 is not sufficient in itself to retain lever 44 in its counterclockwise position. The primary or dominant force which maintains lever 44 in such position is produced by a locking mechanism 52 acting on end portion 53 of the lever, which mechanism comprises an electromagnetic keeper 54 positioned adjacent a pole of an electromagnet 56. Electromagnet 56 is energized and de-energized by an electronic timing circuit illustrated in FIG. 2 and discussed in detail hereinafter.

When shutter blades 22 and 24 are in their respective released positions (not shown), such blades may be returned to their cocked positions by movement of a reset lever 58 along a path in the plane of opening blade 22. Reset lever 58 includes an L-shaped detent portion 60 which impacts or strikes a detent 62 of opening blade 22 upon movement of the reset lever toward axis 16 to thereby drive the opening blade back to its cocked position. As opening blade 22 is driven back to its cocked position, detent 38 engages cam surface 64 of latching lever 30 temporarily pivoting the latching lever in the clockwise direction until the detent has traveled past the cam surface, at which time the latching lever returns to its latching position under the influence of spring 32 to thereby retain the closing blade in its cocked position. During this movement of opening blade 22 to its cocked position, detent 62 engages an L-shaped detent 66 of closing blade 24, which engagement drives the latter back to its cocked position. Detent 66 also functions to maintain closing blade 24 in its cocked position when electromagnet 56 is not energized.

Opening blade 22 may be actuated to effect movement thereof from its cocked position to its released position, that is from its light blocking to its light unblocking position to initiate the film exposure interval, upon manual depression of a body release or shutter actuation button 68 mounted in an external position on camera 10 so as to be available to a camera operator. Actuation button 68 is mechanically coupled to a rod or bar 70 that is slidably mounted (not shown) for movement into abutting engagement with a detent 72 on latch member 30, when the button is depressed. Initial movement of bar 70 causes a projection 74 thereon to engage a contact of a normally open switch S1 to thereby cause the switch to be closed. Continued movement of bar 70 causes end portion 76 to abuttingly engage detent 72 and rotate latch member 30 in a clockwise direction out of engagement with detent 38 of opening blade 22, to thereby release this blade for movement under the influence of spring 26 to an uncovering position with respect to a camera exposure aperture (not shown) and to initiate the film exposure interval. When opening blade 22 moves from its cocked position, detent 62 thereon becomes disengaged from detent 66 on closing blade 24. However, closing blade 24 is retained in its cocked position, in a manner hereinafter described, for a preselected period of time depending on certain exposure parameters to permit film F to be exposed to scene light. At the end of this preselected time period, closing blade 24 is released and the film exposure interval is terminated when this blade is moved under the influence of spring 40 from its cocked position to its released position, that is, from its light unblocking to its light blocking position.

Figure 2:
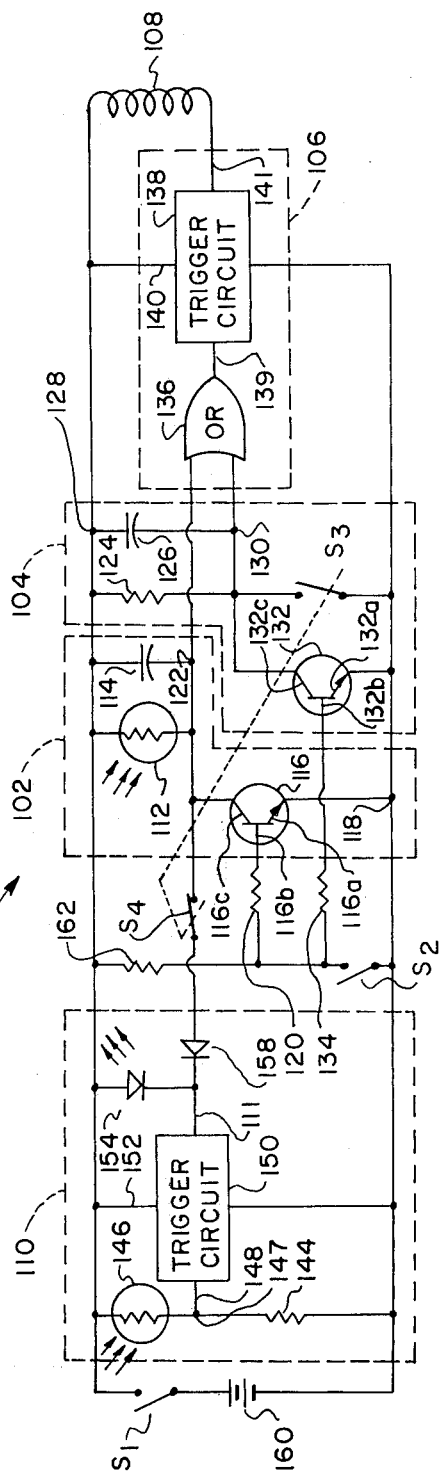
FIG. 2 is a schematic diagram of an electrical circuit in accordance with the teachings of this invention for controlling the shutter mechanism shown in FIG. 1.

Referring now to FIG. 2, there is shown a circuit 100 for controlling a camera shutter mechanism such as shutter mechanism 14 shown in FIG. 1. As shown in FIG. 2, circuit 100 comprises generally first and second timing circuits 102 and 104, circuit 102 having a time constant which is dependent on prevailing light conditions and circuit 104 having a time constant which is independent of prevailing scene light, a shutter control circuit 106 selectively responsive to either timing circuit for energizing and de-energizing a solenoid coil 108 of electromagnet 56, and a light indicator circuit 110 having an output 111 indicating the adequacy of scene light for permitting quality hand-held photographs and for controlling timing circuit 102 in response to the status of such an output.

First timing circuit 102 comprises a light responsive element 112, such as a photocell or the like, disposed within camera 10 to receive light from a scene to be photographed and having an internal resistance which varies as a function of scene light incident thereon and a capacitor 114 connected in parallel with photocell 112 between terminals 122 and 128. Together photocell 112 and capacitor 114 form a parallel R-C timing circuit having a time constant related to the intensity of scene light. Circuit 102 further includes a control transistor 116, having emitter, base, and collector electrodes 116a, 116b, and 116c, respectively, electrode 116a being connected to electrical ground designated 118, electrode 116b being connected to a biasing resistor 120, and electrode 116c being connected to terminal 122 as shown.

Second timing circuit 104 includes a resistor 124 and a capacitor 126 electrically connected in parallel to each other between terminals 128 and 130 so as to form a conventional parallel R-C timing circuit having a fixed, predetermined time constant. Circuit 104 further includes a control transistor 132 having an emitter, base, and collector electrodes 132a, 132b, and 132c, respectively, electrode 132a being connected to electrical ground 118, electrode 132b being connected to a biasing resistor 134, and electrode 132c being connected to terminal 130 for controlling the voltage appearing at that terminal of the parallel R-C combination prior to actuation of shutter mechanism 14.

Connected to terminal 130 in parallel across the collector-to-emitter junction of control transistor 132 is a normally opened time control switch $S_3$. As is diagrammatically shown in FIG. 2 and illustrated in further detail in FIG. 1, switch $S_3$ is coupled or ganged to normally closed control switch $S_4$ which is connected to terminal 122 as shown. Switch $S_3$ may be actuated from its opened to its closed position and switch $S_4$ from its closed to its opened position upon slidable movement of actuatable member 133. Member 133 is mounted in an external position on camera 10 to be avialable to a camera operator for such movement for a reason made apparent hereinafter.

Shutter control circuit 106 comprises logic circuitry such as an OR gate 136 or the like responsive to a signal appearing at either of terminals 122 and 130, and a trigger circuit 138 having dual inputs 139 and 140 connected, respectively, to the output of the OR gate and terminal 128, and an output designated 141. Trigger circuit 138 may be of the type known in the art as a comparator circuit and, more specifically, as a Schmitt trigger circuit or the like having a normally nonconducting input stage and an output of the type which is normally conducting. As shown in FIG. 2, output 141 is connected in series to solenoid 108 which controls electromagnet 56.

Light indicator circuit 110 includes a resistor 144 connected in series to a photocell 146, which has a resistance which varies as a function of scene light incident thereon. Connected to terminal 147 between resistor 144 and photocell 146 is an input 148 of a trigger circuit 150 of the type such as the aforementioned Schmitt trigger circuit. The series combination of resistor 144 and photocell 146 functions to divide the voltage appearing across terminals 128 and 118 in a manner related to the resistance of the photocell with the voltage appearing at junction 147 serving as an input signal to the input stage of trigger circuit 150. The resistance of resistor 144 and of photocell 146 are selectively controlled such that the voltage signal which appears at junction 147 is adequate to turn the normally conducting output stage of trigger circuit 150 OFF if there is sufficient scene illumination to permit a particular film exposure value within 1/30 second.

Connected across the junction consisting of the other input to trigger circuit 150, that is input 152, and output 111 is indicator means 154 of the type for indicating directly the status of a particular parameter such as, for example, the adequacy of scene light for permitting a proper exposure with a hand-held camera within 1/30 second. In accordance with a preferred embodiment, indicator means 154 consists of a light emitting diode (LED) although other suitable ON-OFF devices known to those having skill in the art may be used. Connected as shown between the cathode of LED 154 and terminal 122 is a diode 158 for enabling the voltage signal appearing at output 111 to serve as a control signal for overriding the operation of light dependent timing circuit 102 as described hereinafter. The anode of diode 158 is connected in series to one terminal of control switch S₄ as shown.

To expose film F to scene light, a camera operator depresses actuation button 68 to first close switch S1 to thereby apply electrical power from a power source such as a battery 160 to circuit 100 across terminals 128 and 118. When switch S1 is initially closed, switch S2 is still open thereby permitting control transistors 116 and 132 to be turned ON as current flows through a resistor 162 and base electrode biasing resistors 120 and 134, respectively. Transistors 116 and 132 are driven into saturation so that the voltages appearing at terminals 122 and 130, the collector-to-emitter junction voltages, are relatively small and are inadequate for turning ON the normally non-conducting input stage of trigger circuit 138. The instant switch S1 is closed, voltage is also applied to first and second timing circuits 102 and 104 to charge capacitors 114 and 126, respectively, to approximately the full potential of battery 160.

Further, when switch S1 is initially closed electrical power is applied to light indicator circuit 110. Photocell 146 and resistor 144 thereof divide the voltage of battery 160 in a manner functionally related to the amount of scene illumination incident on the photocell. In discussing the operation of light indicator circuit 110, it is necessary to consider two levels of scene illumination. If scene light is inadequate or too low for permitting film F to be properly exposed within the aforementioned 1/30 second interval, the voltage signal appearing at junction 147 will be relatively low and inadequate to turn the input stage of trigger circuit 150 ON. When this condition occurs, the output stage of circuit 150 remains conducting permitting current to flow through LED 154 and to thereby cause the LED to glow indicating a low scene light condition. Under this operating condition, the voltage appearing at terminal 111 is relatively low so that collector electrode 116c of control transistor 116 is effectively at ground potential, thereby electrically grounding first timing circuit 102.

On the other hand, if scene light is normal or adequate for permitting proper film exposure within a predetermined time period, i.e. the aforementioned 1/30 second, the voltage appearing at terminal 147 is relatively high causing the input stage of circuit 150 to be turned ON and therefore the output stage thereof to be turned OFF. In this state, the output voltage signal at terminal 111 is high, approximately the value of battery 160 so that LED 154 is OFF and does not glow, thereby indicating adequate scene light. Diode 158 is reversed biased by this output signal and does not conduct so that timing circuit 102 is electrically isolated from light indicating circuit 110 during a normal scene light condition. Under this condition, first timing circuit 102 is not clamped to ground, as in the aforementioned low scene light condition, and functions to produce a timing signal as described herinafter.

Still further, when switch S1 is initially closed, solenoid 108 is instantly energized thereby enabling electromagnet keeper 54 to magnetically latch closing blade 24 in its light unblocking position independent of the retaining force applied to the closing blade by the action of detent 62 cooperatively engaging detent 66 when opening blade 22 is in its cocked position.

Consider now the operation of circuit 100 when switch S2 is actuated and is thereby closed. Switch S2 is actuated in response to movement of opening blade 22 from its light blocking position toward its light unblocking position, a condition obtained when shutter actuation button 68 is continued to be depressed such that end portion 76 abuttingly engages detent 72 disengaging latch member 30 from detent 38. When this happens, opening blade 22 is moved to its light unblocking position under the influence of spring 26, thereby permitting switch S2 to close. When switch S2 is closed, base electrodes 116b and 132b are electrically grounded causing control transistors 116 and 132, respectively to be simultaneously turned OFF.

When this condition occurs, timing circuit 102 and timing circuit 104 begin to produce a time variable control signal for terminating the film exposure interval. Second timing circuit 104 functions to produce the control signal for terminating the exposure interval under low scene light conditions since first timing circuit 102 is effectively grounded, as stated hereinbefore, whereas under scene light conditions adequate to permit proper film exposure within time intervals of 1/30 second or less first timing circuit 102 functions to terminate the exposure interval as described hereinbelow.

First consider a low scene light level and the operation of second timing circuit 104. When base electrode 132b is grounded to thereby turn control transistor 132 OFF, capacitor 126 discharges through resistor 124 and transistor 132. This causes the voltage at terminal 130 to increase exponentially in a manner related to the product of the resistance of resistor 124 and the capacitance of capacitor 126, these values being selectively controlled such that the trigger or threshold voltage for trigger circuit 138 is reached in 1/30 second, at which point the normally non-conducting input stage of trigger circuit 138 is turned ON, thereby switching its output stage OFF de-energizing solenoid 108. When this happens, electromagnetic keeper 54 releases retaining lever 44 permitting closing blade 24 to move to its light blocking position under the influence of spring 40 to terminate the film exposure interval at 1/30 second. During this time, circuit 100 functions overall as if first timing circuit 102 was not present since terminal 122 is effectively at ground potential due to the low potential at terminal 111 when LED 154 is ON under a low scene light level.

Considering now scene light levels adequate to permit film F to be properly exposed in less than 1/30 second and, in this regard, the operation of circuit 100 and in particular first timing circuit 102. Timing circuit 102 begins to produce a control signal at terminal 122 the instant switch S2 is closed grounding control transistor 116. This control signal is functionally related to the resistance of photocell 112, i.e. the scene light incident thereon. The instant S2 is closed, capacitor 114 begins to discharge through photocell 112 and through the collector-to-emitter junction of control transistor 116. When this happens, the voltage at terminal 122 begins to increase exponentially at a rate determined by the product of the photocell resistance and the capacitance of capacitor 114. Thus, the voltage signal established at terminal 122 is related to scene light and, similarly to timing circuit 104, when in excess of the threshold voltage of trigger circuit 138, functions to turn ON the normally non-conducting input stage thereof, thereby turning OFF its output stage de-energizing solenoid 108. As described previously herein, de-energization of solenoid 108 causes electromagnetic keeper 54 to release retaining means 48 to permit closing blade 24 to move to its light blocking position under the influence of spring 40 thereby terminating the exposure interval.

During this time, second timing circuit 104 is functioning as described previously hereinbefore but has no effect on actuating closing blade 24 since under higher scene light levels its time constant is greater than the R-C time constant of timing circuit 102 and, consequently, does not effect actuation of the closing blade.

The camera operator may prefer not to limit the exposure interval to 1/30 second in a low light condition. This would be so for a number of reasons such as, for example, in the event the camera was mounted on a stationery platform which would avoid the need to limit exposure time or in the event it was desired to obtain photographs having certain "special effects".

To obtain an extended time photograph, the operator slides release member 133 from right to left as viewed in FIG. 1, which condition cause switch S3 to close and switch S4 to open. When switch S3 is closed, light independent timing circuit 104 is electrically grounded at terminal 130 and is thereby rendered ineffective to control solenoid coil 108 through circuit 106. With switch S4 open, light indicator circuit 110 is electrically disconnected from light dependent timing circuit 102 and, therefore, does not function to ground that circuit when LED 154 is conducting under a low light condition. Under these conditions, timing circuit 104 is overridden and shutter control circuit 106 is under the exclusive or sole control of light dependent timing circuit 102, which condition permits an extended time exposure under a low light condition.

In accordance with a preferred embodiment of the instant invention, there has been described a shutter control circuit for actuating a shutter mechanism of a camera which accomplishes the aforementioned objectives.

The invention has been described in detail with particular reference to a preferred embodiment thereof, but it will be understood that variations and modifications can be effected within the spirit and scope of the invention.

I claim:

1. In a camera having a shutter mounted for movement between light blocking and unblocking positions for regulating exposure of film to scene light, the combination comprising:

control means, operatively associated with said shutter and being actuatable, for moving said shutter between said light unblocking and blocking positions;

timing means, associated with said control means and including photosensitive means disposed to receive scene light, for regulating said control means to move said shutter between said light unblocking and blocking positions over an interval of time related to scene light intensity;

means, associated with said control means, for limiting the interval of said exposure independent of said photosensitive means; and selectively operable means, associated with said limiting means, for deactivating said limiting means to permit said interval of exposure to be controlled solely in relation to scene light intensity.

2. In a camera having an aperture for exposing photographic film to scene light and actuatable shutter means movable relative to the aperture between a light unblocking position and a light blocking position to regulate the amount of scene light impinging on such film, the improvement comprising exposure control apparatus for controlling said actuatable means comprising:

a. means operably associated with said actuatable shutter means and energizable for regulating movement of said shutter means between its light unblocking position and its light blocking position;

b. first timer means responsive to scene light for operating said energizable means after an interval of time related to the intensity of scene light;

c. second timer means for operating said energizable means after an interval of time that is independent of the scene light intensity; and d. selectively operatable means for permitting said first timer means to exclusively operate said energizable means.

3. In a camera having an aperture for exposing photographic film to scene light and actuatable means movable relative to the aperture between a light unblocking position and a light blocking position to regulate the amount of scene light impinging on such film, the improvement comprising exposure control apparatus for controlling said actuatable means comprising:

a. means operably asssociated with said actuatable means and energizable for regulating movement of said actuatable means between its light unblocking position and its light blocking position;

b. first timer means responsive to scene light for operating said energizable means after an interval of time related to the intensity of scene light;

c. second timer means for operating said energizable means after an interval of time that is independent of the scene light intensity;
d. means for enabling said first and said second timer means to be actuated concurrently; and
e. operatable means for rendering said second timer means ineffective to operate said energizable means while permitting said first timer means to exclusively operate said energizable means.

4. In a camera having an aperture for exposing photographic film to scene light and actuatable means movable relative to the aperture between a light unblocking position and a light blocking position to regulate the amount of scene light impinging on such film, the improvement comprising exposure control apparatus for controlling the light regulating means comprising:
a. means operably associated with said actuatable means and energizable for regulating movement of said actuatable means between its light unblocking position and its light blocking position;
b. first timer means responsive to scene light for operating said energizable means after an interval of time related to the intensity of scene light;
c. second timer means for operating said energizable means after an interval of time that is independent of the scene light intensity;
d. means for enabling said first and said second timer means to be actuated concurrently; and
e. operatable means for overriding said second timer means to permit said first timer means to exclusively operate said energizable means.

5. In a camera having an aperture for exposing photographic film to scene light and actuatable means movable relative to the aperture between a light unblocking position and a light blocking position to regulate the amount of scene light impinging on such film, the improvement comprising exposure control apparatus for controlling the light regulating means comprising:
a. energizable means operably associated with said actuatable means for regulating movement of said actuatable means from its light unblocking position to its light blocking position to terminate a film exposure interval;
b. first timer means responsive to scene light for de-energizing said energizable means after an interval of time related to the intensity of scene light;
c. second timer means for de-energizing said energizable means after a predetermined interval of time that is independent of scene light intensity;
d. means associated with the initiation of the exposure interval for actuating said first timer means and said second timer means substantially simultaneously;
e. means for indicating the adequacy of scene light to effect a particular film exposure value within said predetermined interval of time;
f. means responsive to said scene light indicating means for rendering said first timer means ineffective to de-energize said energizable means when said particular exposure value cannot be effected within said predetermined time interval; and
g. operatable switch means for overriding said scene light indicating means and said second timer means to permit said first timer means to operate said energizable means exclusively in accordance with the intensity of scene light.

6. In a camera having an aperture for exposing photographic film to scene light and actuatable shutter means movable relative to the aperture between a light unblocking position and a light blocking position to regulate the amount of scene light impinging on such film, the improvement comprising exposure control apparatus for controlling said actuatable shutter means comprising:
a. energizable means operably associated with said actuatable shutter means for regulating movement of said shutter means from its light unblocking position to its light blocking position to terminate a film exposure interval;
b. first timer means having a control terminal operably associated with said energizable means, said first timer means being responsive to scene light for producing at its control terminal a first control signal having a particular parameter related to the intensity of scene light;
c. second timer means having a control terminal operably associated with said energizable means, said second timer means being adapted to produce at its control terminal after a predetermined interval of time a light independent control signal having a particular parameter that is independent of the intensity of scene light;
d. means for indicating the adequacy of scene light to effect a particular film exposure value within said predetermined interval of time;
e. means responsive to said scene light indicating means for biasing said control terminal of said first timer means to render said first timer means ineffective to produce said light dependent control signal; and
f. selectively operatable switch means for electrically grounding said control terminal of said second timer means and for rendering said control terminal biasing means nonresponsive to said light adequacy indicating means to permit said first timer means to operate said energizable means exclusively in accordance with the intensity of the scene light.

7. In a camera having an aperture for exposing photographic film to scene light and actuatable shutter means movable relative to the aperture between a light unblocking position and a light blocking to regulate the amount of scene light impinging on such film, the improvement comprising exposure control apparatus for controlling said actuatable shutter means comprising:
a. energizable means operably associated with said actuatable shutter means for regulating movement of said shutter means from its light unblocking position to its light blocking position to terminate a film exposure interval;
b. first timer means for operating said energizable means after an interval of time that is related to the intensity of scene light;
c. second timer means for operating said energizable means after a predetermined interval of time independent of scene light intensity;
d. means for determining the anticipated film exposure interval relative to said predetermined interval of time; and
e. means for effectively enabling either said first timer means or said second timer means to operate said energizable means exclusively when scene light intensity level is such as to produce an exposure time in excess of said predetermined time interval.

* * * * *